US009163141B2

(12) United States Patent
Becraft et al.

(10) Patent No.: US 9,163,141 B2
(45) Date of Patent: Oct. 20, 2015

(54) POLYMERIC BLEND COMPRISING POLYLACTIC ACID

(75) Inventors: Michael L. Becraft, Greer, SC (US); Paul A. Hughes, Greenville, SC (US); Slawomir Opuszko, Duncan, SC (US)

(73) Assignee: Cryovac, Inc., Charlotte, NC (US)

( * ) Notice: Subject to any disclaimer, the term of this patent is extended or adjusted under 35 U.S.C. 154(b) by 2866 days.

(21) Appl. No.: 11/429,775

(22) Filed: May 8, 2006

(65) Prior Publication Data

US 2007/0255013 A1 Nov. 1, 2007

Related U.S. Application Data

(60) Provisional application No. 60/795,633, filed on Apr. 27, 2006.

(51) Int. Cl.
| | | |
|---|---|---|
| C08L 33/02 | (2006.01) | |
| C08L 53/00 | (2006.01) | |
| C08L 67/00 | (2006.01) | |
| C08L 67/04 | (2006.01) | |
| C08L 23/08 | (2006.01) | |
| C08L 23/14 | (2006.01) | |
| C08L 77/10 | (2006.01) | |

(52) U.S. Cl.
CPC ............... *C08L 67/04* (2013.01); *C08L 23/08* (2013.01); *C08L 23/14* (2013.01); *C08L 77/10* (2013.01)

(58) Field of Classification Search
USPC .......................................... 525/190
See application file for complete search history.

(56) References Cited

U.S. PATENT DOCUMENTS

| | | | |
|---|---|---|---|
| 4,581,262 A | 4/1986 | Karabedian | |
| 4,585,679 A | 4/1986 | Karabedian | |
| 4,626,455 A | 12/1986 | Karabedian | |
| 4,938,683 A | 7/1990 | Boice | |
| 4,985,300 A | 1/1991 | Huang | |
| 4,987,186 A | 1/1991 | Akiyama | |
| 5,252,642 A | 10/1993 | Sinclair et al. | |
| 5,534,606 A | 7/1996 | Bennett et al. | |
| 5,583,192 A | 12/1996 | Bennett et al. | |
| 5,648,443 A | 7/1997 | Okamoto et al. | |
| 5,658,625 A | 8/1997 | Bradfute et al. | |
| 5,714,573 A | 2/1998 | Randall et al. | |
| 5,756,651 A | 5/1998 | Chen et al. | |
| 5,766,748 A | 6/1998 | Ikado et al. | |
| 5,859,116 A | 1/1999 | Shih | |
| 5,866,634 A | 2/1999 | Tokushige et al. | |
| 5,866,675 A * | 2/1999 | Ahmed et al. ................. 528/339 |
| 5,908,918 A | 6/1999 | Chen et al. | |
| 5,922,832 A | 7/1999 | Randall et al. | |
| 6,005,019 A | 12/1999 | Liu | |
| 6,117,928 A | 9/2000 | Hiltunen et al. | |
| 6,153,276 A * | 11/2000 | Oya et al. ................. 428/35.2 |
| 6,262,184 B1 | 7/2001 | Kananmori et al. | |
| 6,406,763 B1 | 6/2002 | Wolf et al. | |
| 6,423,421 B1 | 7/2002 | Banaszak et al. | |
| 6,479,138 B1 | 11/2002 | Childress | |
| 6,495,631 B1 | 12/2002 | Randall et al. | |
| 6,521,336 B2 | 2/2003 | Narita et al. | |
| 6,544,607 B1 | 4/2003 | Kuroki | |
| 6,583,232 B1 | 6/2003 | Brown | |
| 6,660,211 B2 | 12/2003 | Topolkaraev et al. | |
| 6,709,761 B2 | 3/2004 | Hirose et al. | |
| 6,720,374 B2 | 4/2004 | Sahida | |
| 6,803,443 B1 | 10/2004 | Ariga et al. | |
| 6,852,806 B2 | 2/2005 | Sasagawa et al. | |
| 6,855,406 B2 | 2/2005 | Takayasu et al. | |
| 6,869,985 B2 * | 3/2005 | Mohanty et al. ............... 523/124 |
| 6,872,462 B2 | 3/2005 | Roberts et al. | |
| 6,905,759 B2 | 6/2005 | Topolkaraev et al. | |
| 6,943,214 B2 | 9/2005 | Flexman | |
| 6,960,374 B1 | 11/2005 | Terada et al. | |
| 7,160,604 B2 | 1/2007 | Ginossatis | |
| 7,354,973 B2 * | 4/2008 | Flexman ....................... 525/162 |
| 2002/0192412 A1 | 12/2002 | Satani et al. | |
| 2003/0021973 A1 | 1/2003 | Topolkaraev et al. | |
| 2003/0039775 A1 | 2/2003 | Kong | |
| 2003/0068453 A1 | 4/2003 | Kong | |
| 2003/0083440 A1 | 5/2003 | Sahida et al. | |
| 2003/0119959 A1 | 6/2003 | Inayama et al. | |

(Continued)

FOREIGN PATENT DOCUMENTS

| | | |
|---|---|---|
| EP | 0188374 | 7/1986 |
| EP | 0189986 | 8/1986 |

(Continued)

OTHER PUBLICATIONS

Hartmann & Whiteman "Polylactide, a New Thermoplastic for Extrusion Coating" Cargill-Dow ANTEC (Jan. 2001).
"Review of Coextrudable Adhesive R&D for PLA and PE Conducted by NatureWorks LLC" NatureWorks Technical Fact Sheet (Sep. 2005).
"NatureWorks PLA Polymer 4060D for Heat Seal Layer in Coextruded Oriented Films" Technical Technical Bulletin (Jan. 2005).
"NatureWorks PLA Film Technical Bulletin: Printing and Laminating" Technical Bulletin (Jan. 2006).

(Continued)

*Primary Examiner* — John J Figueroa
(74) *Attorney, Agent, or Firm* — Daniel B. Ruble

(57) ABSTRACT

A blend comprises at least 50 wt. % polylactic acid and at least 5 wt. % of polymer selected from one or more of: (i) ethylene/unsaturated ester copolymer having an unsaturated ester comonomer content of at least about 30% based on the weight of the ethylene/unsaturated ester copolymer; (ii) modified ethylene/unsaturated ester copolymer; (iii) polyetheramide block copolymer; (iv) propylene/ethylene copolymer comprising at least about 12% and at most about 16% ethylene monomer content based on the weight of the propylene/ethylene copolymer; and (v) styrenic block copolymer. An article such as a tray, film, or sheet may comprise the blend.

24 Claims, No Drawings

(56) References Cited

U.S. PATENT DOCUMENTS

| | | |
|---|---|---|
| 2003/0204017 A1 | 10/2003 | Stevens |
| 2004/0053003 A1 | 3/2004 | Coates et al. |
| 2004/0121172 A1 | 6/2004 | Hofmann |
| 2004/0225065 A1 | 11/2004 | Inayama et al. |
| 2004/0230001 A1* | 11/2004 | Flexman .................. 525/154 |
| 2005/0131120 A1 | 6/2005 | Flexman |
| 2005/0136259 A1 | 6/2005 | Mohanty |
| 2005/0142313 A1 | 6/2005 | Grah |
| 2005/0154114 A1 | 7/2005 | Hale |
| 2005/0159583 A1 | 7/2005 | Imamura |
| 2005/0182201 A1 | 8/2005 | Matsumoto |
| 2005/0221032 A1 | 10/2005 | Yamane et al. |
| 2005/0227099 A1 | 10/2005 | Hiruma |
| 2005/0228092 A1 | 10/2005 | Fujita |
| 2005/0281997 A1 | 12/2005 | Grah |
| 2006/0275564 A1 | 12/2006 | Grah et al. |
| 2007/0098933 A1 | 5/2007 | Opuszko et al. |
| 2007/0196600 A1 | 8/2007 | Hutchinson et al. |
| 2007/0254118 A1 | 11/2007 | Opusko et al. |
| 2008/0026170 A1 | 1/2008 | Yamada et al. |
| 2008/0050603 A1 | 2/2008 | Randall et al. |
| 2008/0197540 A1 | 8/2008 | McAllister et al. |

FOREIGN PATENT DOCUMENTS

| | | |
|---|---|---|
| EP | 1 153 743 A1 | 11/2001 |
| EP | 1 355 985 | 8/2002 |
| EP | 1 302 509 | 4/2003 |
| EP | 1 340 690 | 9/2003 |
| EP | 1 454 958 | 9/2004 |
| EP | 1 473 324 | 11/2004 |
| EP | 1 491 585 A1 | 12/2004 |
| EP | 1 619 021 A1 | 1/2006 |
| EP | 1 728 816 A2 | 12/2006 |
| EP | 1 810 821 A | 7/2007 |
| JP | 2003-147264 | 5/2003 |
| JP | 2003-160202 | 6/2003 |
| JP | 2003-313404 | 11/2003 |
| JP | 2004-058586 | 2/2004 |
| JP | 2004-217289 | 8/2004 |
| JP | 2004-262029 | 9/2004 |
| JP | 2004-351629 | 12/2004 |
| JP | 2004-358721 | 12/2004 |
| JP | 2005-002199 | 1/2005 |
| JP | 2005-002201 | 1/2005 |
| JP | 2005-007610 | 1/2005 |
| JP | 2005-028615 | 2/2005 |
| WO | 00/01426 | 1/2000 |
| WO | WO 03/016053 A | 2/2003 |
| WO | WO 2004/067604 | 8/2004 |
| WO | 2005/061628 A1 | 7/2005 |
| WO | 2005/066248 A1 | 7/2005 |
| WO | 2006/002372 A2 | 1/2006 |
| WO | WO 2006/121118 A | 11/2006 |
| WO | WO 2007/058783 A1 | 5/2007 |

OTHER PUBLICATIONS

Ljungberg et al. "Film Extrusion and Film Weldability of PLA Plasticised with Triacetine and Tributyl Citrate" J. Applied Polymer Sci. 88, No. 14, p. 3239-47 (Jun. 28, 2003).

* cited by examiner ary by reference.
POLYMERIC BLEND COMPRISING POLYLACTIC ACID This application claims priority from and the benefit of U.S. Provisional Patent Application Serial No. 60/795,633 filed Apr. 27, 2006 and entitled "Polymeric Blend Comprising Polylactic Acid", which is incorporated herein in its entirety by reference.

BACKGROUND

The present invention relates to blends of polylactic acid and other polymers, and to articles comprising the blends.

Polylactic acid is a polymer that provides some environmental advantages because it is biodegradable and also may be manufactured from renewable-resource feedstock (e.g., corn). It may be desirable to enhance the heat seal strength, toughness, and/or other properties of compositions and articles comprising polylactic acid. It may also be desirable to maintain or provide acceptable optical properties (e.g., haze and/or gloss) of such compositions and articles.

SUMMARY

One or more embodiments of the present invention may address one or more of the aforementioned problems.

In one embodiment, a blend comprises at least 50%, by weight of the blend, of polylactic acid. The blend also comprises at least 5%, by weight of the blend, of polymer selected from one or more of: (i) ethylene/unsaturated ester copolymer having an unsaturated ester comonomer content of at least about 30% based on the weight of the ethylene/unsaturated ester copolymer; (ii) modified ethylene/unsaturated ester copolymer; (iii) polyetheramide block copolymer; (iv) propylene/ethylene copolymer comprising at least about 12% and at most about 16% ethylene monomer content based on the weight of the propylene/ethylene copolymer; and (v) styrenic block copolymer.

The various embodiments of the invention will be more readily understood and appreciated by reference to the detailed description.

DETAILED DESCRIPTION

A blend may comprise (1) polylactic acid and (2) polymer selected from one or more of:
(i) ethylene/unsaturated ester copolymer having an unsaturated ester comonomer content of at least about 30% based on the weight of the ethylene/unsaturated ester copolymer;
(ii) modified ethylene/unsaturated ester copolymer;
(iii) polyetheramide block copolymer;
(iv) propylene/ethylene copolymer; and
(v) styrenic block copolymer.

The blend may be useful, for example, to make films and trays.

Polylactic Acid

The blend comprises polylactic acid. Polylactic acid includes:
(i) homopolymers of lactic acid, including poly(L-lactic acid) in which the monomer unit is L-lactic acid, poly(D-lactic acid) in which the monomer unit is D-lactic acid, and poly(D,L-lactic acid) in which the monomer structure units are D,L-lactic acid, that is, a mixture in various proportions (e.g., a racemic mixture) of D-lactic acid and L-lactic acid monomer units; and (ii) copolymers of lactic acid comprising at least about 50 wt. % lactic acid comonomer content based on the weight of the copolymer, for example, at least about any of the following wt. % amounts of lactic acid comonomer content: 60, 70, 80, 90 wt. %, and comprising one or more comonomers other than lactic acid comonomer in amounts of less than about any of the following amounts: 50, 30, 20, and 10 wt. %, by weight of the copolymer. Exemplary comonomers include hydroxycarboxylic acids other than lactic acid, for example, one or more of any of the following hydroxycarboxylic acids: glycolic acid, hydroxybutyrate (e.g., 3-hydroxybutyric acid, 4-hydroxybutyric acid), hydroxyvaleric acid (e.g., 4-hydroxyvaleric acid, 5-hydroxyvaleric acid) and hydroxycaproic acid (e.g., 6-hydroxycaproic acid).

Polylactic acid may be made, for example, by polycondensation methods. In the polycondensation method, for example, L-lactic acid, D-lactic acid, or a mixture of these, or lactic acid and one or more other hydroxycarboxylic acids, may be directly subjected to dehydropolycondensation to obtain a polylactic acid of desired composition. For example, in the direct dehydration polycondensation process the lactic acid or other hydroxycarboxylic acids may be subjected to azeotropic dehydration condensation in the presence of an organic solvent, such as a diphenyl ether-based solvent. Such polymerization reaction, for example, may progress by removing water from the azeotropically distilled solvent and returning substantially anhydrous solvent to the reaction system.

Polylactic acid may also be made by ring-opening polymerization methods. In the ring-opening polymerization method, lactide (i.e., cyclic dimer of lactic acid) may be subjected to polymerization by the aid of a polymerization-adjusting agent and a catalyst to obtain polylactic acid. Lactide includes L-lactide (i.e., dimer of L-lactic acid), D-lactide (i.e., dimer of D-lactic acid), DL-lactide (i.e., mixture of L- and D-lactides), and meso-lactide (i.e., cyclic dimer of D- and L-lactic acids). These isomers can be mixed and polymerized to obtain polylactic acid having a desired composition and crystallinity. Any of these isomers may also be copolymerized by ring-opening polymerization with other cyclic dimers (e.g., glycolide, a cyclic dimer of glycolic acid) and/or with cyclic esters such as caprolactone, propiolactone, butyrolactone, and valerolactone.

The weight average molecular weight of polylactic acid used in any embodiments of the present invention may be at least about any of the following: 5,000, 10,000, 15,000, 30,000, and 100,000; and may be at most about any of the following: 250,000, 300,000, 400,000, and 1,000,000. Commercially available polylactic acids include those sold by NatureWorks LLC (owned by Cargill Corporation), such as those sold under the NatureWorks PLA 4032, 4042, and 4060 trade names. It is believed that the PLA 4032 grade has a D isomer monomer content of from 1.2 to 1.6 wt. %, that the PLA 4042 grade has a D isomer monomer content of from 3.7 to 4.8 wt. %, and the PLA 4060 grade has a D isomer monomer content of from 11.0 to 13.0 wt. %.

The blend may comprise at least about any of the following amounts of polylactic acid (e.g., any specific type of polylactic acid described herein): 50, 60, 70, 80, and 90 wt. %, based on the weight of the blend; and may comprise at most about any of the following amounts of polylactic acid (e.g., any specific type of polylactic acid described herein): 95, 90, 80, 70, and 60 wt. %, based on the weight of the blend.

The blend may comprise poly(hydroxycarboxylic acid) other than polylactic acid in an amount of less than about any of the following: 40, 30, 20, 10, 5, and 1 wt. %, based on the weight of the blend. The blend may be essentially free of poly(hydroxycarboxylic acid) other than polylactic acid.

The blend may comprise the polymer (i.e., one or more of the ethylene/unsaturated ester copolymer, modified ethylene/unsaturated ester copolymer, polyetheramide block copolymer, propylene/ethylene copolymer, and styrene/butadiene block copolymer discussed herein) in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend.

Ethylene/Unsaturated Ester Copolymer

The blend may comprise ethylene/unsaturated ester copolymer. Ethylene/unsaturated ester copolymer includes copolymers of ethylene and one or more unsaturated ester monomers. Useful unsaturated esters include:

1) vinyl esters of aliphatic carboxylic acids, where the esters have from 4 to 12 carbon atoms, 2) alkyl esters of acrylic or methacrylic acid (collectively, "alkyl(meth)acrylate"), where the esters have from 4 to 12 carbon atoms, and 3) glycidyl esters of acrylic or methacrylic acid (collectively, "glycidyl (meth)acrylate"). The ethylene/unsaturated ester copolymer may comprise a mixture of the second and third types of comonomers, for example to form an ethylene/alkyl (meth)acrylate/gylcidyl (meth)acrylate copolymer.

Representative examples of the first ("vinyl ester") group of monomers include vinyl acetate, vinyl propionate, vinyl hexanoate, and vinyl 2-ethylhexanoate. The vinyl ester monomer may have at least any of the following number of carbon atoms: 4, 5, and 6 carbon atoms; and may have at most any of the following number of carbon atoms: 4, 5, 6, 8, 10, and 12 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have at least any of the following number of carbon atoms: 4, 5, and 6 carbon atoms; and may have at most any of the following number of carbon atoms: 4, 5, 6, 8, 10, and 12 carbon atoms.

Representative examples of the third ("glycidyl (meth)acrylate") group of monomers include gylcidyl acrylate and gylcidyl methacrylate ("GMA").

The ethylene/unsaturated ester copolymer may comprise (i) vinyl ester of aliphatic carboxylic acid comonomer content of any one or more of the above listed types of vinyl esters of aliphatic carboxylic acids and/or (ii) alkyl(meth)acrylate comonomer content of any one or more of the above listed types of alkyl(meth)acrylates in at least about any of the following amounts (based on the weight of the copolymer): 5, 10, 15, 20, 24, 25, 26, 27, 28, 29, 30, 32, 34, 36, 38, 40, 45, 50, 55, and 60 wt. %; and at most about any of the following amounts (based on the weight of the copolymer): 10, 15, 20, 25, 26, 27, 28, 29, 30, 32, 34, 36, 38, 40, 45, 50, 55, 60, 65, and 70 wt. %.

The ethylene/unsaturated ester copolymer may comprise glycidyl (meth)acrylate comonomer content (e.g., any one or more of the above listed types of glycidyl (meth)acrylates) in at least about any of the following amounts (based on the weight of the copolymer): 0.5, 1, 2, 3, 4, 5, 6, 7, 8, 9, and 10 wt.%; and at most about any of the following amounts (based on the weight of the copolymer): 1, 2, 3, 4, 5, 6.7, 8, 9, 10, and 12 wt.%.

The unsaturated ester comonomer content (e.g., the vinyl ester, alkyl (meth)acrylate, and/or glycidyl (meth)acrylate comonomer content) of the ethylene/unsaturated ester copolymer may collectively total at least about any of the following amounts (based on the weight of the copolymer): 25, 26, 27, 28, 29, 30, 32, 34, 36, 38, 40, 45, 50, 55, and 60 wt.%; and collectively total at most about any of the following amounts (based on the weight of the copolymer): 30, 32, 34, 36, 38, 40, 45, 50, 55, 60, 65, and 70 wt. %.

The ethylene monomer content of the ethylene/unsaturated ester copolymer may be at least about, and/or at most about, any of the following (based on the weight of the copolymer): 45, 50, 55, 60, 65, 70, and 80 wt. %.

Representative examples of ethylene/unsaturated ester copolymers include:
ethylene/vinyl acetate,
ethylene/methyl acrylate,
ethylene/methyl methacrylate,
ethylene/ethyl acrylate,
ethylene/ethyl methacrylate,
ethylene/butyl acrylate,
ethylene/2-ethylhexyl methacrylate,
ethylene/glycidyl acrylate,
ethylene/glycidyl methacrylate (e.g., that available from Arkema Corporation under the LOTADER 8840 trade name, believed to have 8 wt. % GMA monomer content),
ethylene/methyl acrylate/glycidyl acrylate,
ethylene/methyl methacrylate/glycidyl acrylate,
ethylene/ethyl acrylate/glycidyl acrylate,
ethylene/ethyl methacrylate/glycidyl acrylate,
ethylene/butyl acrylate/glycidyl acrylate,
ethylene/2-ethylhexyl methacrylate/glycidyl acrylate,
ethylene/methyl acrylate/glycidyl methacrylate (e.g., that available from Arkema Corporation under the LOTADER 8900 trade name, believed to have about 24 wt. % methyl acrylate monomer content and about 8 wt. % GMA monomer content),
ethylene/methyl methacrylate/glycidyl methacrylate,
ethylene/ethyl acrylate/glycidyl methacrylate,
ethylene/ethyl methacrylate/glycidyl methacrylate,
ethylene/butyl acrylate/glycidyl methacrylate (e.g., that available from Arkema Corporation under the LOTADER AX 8999 trade name, believed to have 28 wt. % butyl acrylate monomer content and 1 wt. % GMA monomer content), and
ethylene/2-ethylhexyl methacrylate/glycidyl methacrylate.

The blend may comprise ethylene/unsaturated ester copolymer (e.g., any one or more of any of the ethylene/unsaturated ester copolymers discussed in this Application) in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend. The blend may comprise unmodified ethylene/unsaturated ester copolymer (i.e., ethylene/unsaturated ester copolymer that is not modified as discussed below) in any of the amounts set forth in the previous sentence.

Modified Ethylene/Unsaturated Ester Copolymer

The blend may comprise modified ethylene/unsaturated ester copolymer. Modified ethylene/unsaturated ester copolymer includes ethylene/unsaturated ester copolymers (i.e., any of the ethylene/unsaturated ester copolymers described in the previous section of this Application), which are modified (e.g., grafted) with unsaturated carboxylic acid anhydride (i.e., anhydride-modified polymer) to incorporate anhydride functionality. The modification may promote or enhance the adhesion characteristics of the copolymer. Examples of unsaturated carboxylic acid anhydrides include maleic anhydride, fumaric anhydride, and unsaturated fused ring carboxylic acid anhydrides (e.g., as described in U.S. Pat. No. 4,087,588).

Examples of modified ethylene/unsaturated ester copolymer include: maleic anhydride-grafted ethylene/vinyl acetate copolymer having a vinyl acetate comonomer content of about 25 wt. % available from DuPont Corporation under the BYNEL 3861 trademark; maleic anhydride modified ethylene/vinyl acetate copolymer having a vinyl acetate monomer content of about 28 wt. % available from DuPont Corporation under the FUSABOND MC250D trade name; and ethylene/alkyl acrylate/maleic anhydride copolymers, such as those available from Arkema Corporation under the LOTADER series trade name, such as ethylene/methyl acrylate/maleic anhydride copolymers, ethylene/butyl acrylate/maleic anhydride copolymers, and ethylene/ethyl acrylate/maleic anhydride copolymer, having from 6 to 30 wt. % alkyl acrylate monomer content and from 0.3 to 3.8 wt. % maleic anhydride comonomer content.

Modified ethylene/unsaturated ester copolymer may be made by grafting or copolymerization, as is known in the art. Useful anhydride-modified polymers may contain anhydride moiety in an amount (based on the weight of the modified polymer) of at least about any of the following: 0.1%, 0.5%, 1%, and 2%; and at most about any of the following: 10%, 7.5%, 5%, and 4%.

The blend may comprise modified ethylene/unsaturated ester copolymer in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend. The blend may comprise modified ethylene/unsaturated ester copolymer and unmodified ethylene/unsaturated ester copolymer totaling any of the amounts set forth in the previous sentence.

Polyetheramide Block Copolymer

The blend may comprise polyetheramide block copolymer. Polyetheramide block copolymer includes block copolymer made by polycondensation reaction of a polyether diol and a carboxylic acid-terminated polyamide. For example, the polyetheramide copolymer may comprise a linear and regular chain of: (i) a polyamide block comprising a reoccurring moiety of formula (I):

—NH—(CH$_2$)$_n$—(CO)—   (I)

wherein n may rang from 5 to 12; and (ii) a polyether block comprising a recurring moiety of formula (II):

—(CH$_2$)$_m$—O—   (II)

wherein m may range from 2 to 4. For example, the polyether diol block may be prepared from a polybutylene oxide or a polypropylene oxide. Also, the polyether block may be selected from polyoxyethylene, polyoxypropylene, and polyoxytetramethylene. The carboxylic amide block may be prepared from a carboxylic acid-terminated nylon-12 (polylaurolactam) or nylon-6 (polycaprolactam). The polyamide block may also be selected from nylon-6/6,6, nylon-6,6, nylon-11, and nylon-12. The properties of polyetheramide block copolymer (e.g. flex modulus and melting point) may be modified, for example, by changing the nature of the polyamide block and the polyether block, and/or by changing the mass balance between these two blocks. Useful polyetheramide block copolymer may comprise just, or consist essentially of, polyether blocks and polyamide blocks. Useful polyetheramide block copolymer may comprise comonomer content other than polyether blocks and polyamide blocks, for example, polyester block resulting in polyetheresteramide block copolymer.

The polyetheramide block copolymer may have a melting point that is below the decomposition temperature of polylactic acid, that is, so that a blend of polyetheramide block copolymer and polylactic acid may be processed and exposed to extrusion machinery temperatures without degrading the polylactic acid. (The decomposition temperature of some grades of polylactic acid is believed to be around 250° C.) For example, the polyetheramide block copolymer may have a melting point of at most about, and/or at least about any of the following: 210, 200, 190, 180, 170, 160, 150, and 140° C. All references to the melting point or melting temperature of a polymer, a resin, or a film layer in this application refer to the melting peak temperature of the dominant melting phase of the polymer, resin, or layer as determined by differential scanning calorimetry according to ASTM D-3418.

Exemplary polyetheramide block copolymer include those available from the Arkema Group under the PEBAX trade name, such as PEBAX 2533, PEBAX 3533 (believed to have a melting point of about 152° C.), PEBAX 4033 (believed to have a melting point of about 168° C.), PEBAX 5512 (believed to have a melting point of about 195° C.), PEBAX 5533, and PEBAX 6333. PEBAX 5533 polyetheramide block copolymer is believed to have a melting point of about 155° C.

The blend may comprise polyetheramide block copolymer (e.g., any one or more of those discussed herein) in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend.

Propylene/Ethylene Copolymer

The blend may comprise propylene/ethylene copolymer ("PEC"). PEC is a propylene/ethylene copolymer having a majority weight % content of propylene comonomer. ("Copolymer" as used in this application means a polymer derived from two or more types of monomers, and includes terpolymers, etc.) The PEC may have an ethylene monomer content of at least about any of the following: 12, 13, 13.5, 14, and 15 wt. %; and at most about any of the following: 16, 15, 14, 13.5 and 13 wt. %, based on the weight of the copolymer. The PEC may have a density of at least about, and/or at most about, any of the following: 0.885, 0.900, 0.902, and 0.905 g/cc. Unless otherwise indicated, all densities herein are measured according to ASTM D1505. The PEC may have a melting point of at least about, and/or at most about, any of the following: 100, 105, 110, 115, 120, 125, 130, 135, 140, and 150° C. The PEC may have a Vicat softening temperature of at least about, and/or at most about, any of the temperatures in the previous sentence. All references to Vicat softening temperatures in this Application are measured according to ASTM 1525 (1 kg).

The PEC may consist essentially of propylene and ethylene comonomers, or may comprise three, or three or more, types of comonomers. The PEC may include, for example, propylene/ethylene/butene copolymers, which may comprise butene comonomer content of at most about, and/or at least about, any of the following: 3, 5, 8, 10, 12, and 15 wt. %, based on the weight of the copolymer.

The PEC may comprise random PEC. The PEC in the blend may comprise at least about, and/or at most about, 80%, 90%, 95%, and 100% random PEC, based on the total weight of PEC in the blend.

The PEC may comprise heterogeneous PEC and/or homogeneous PEC. The PEC in the blend may comprise at least about, and/or at most about, 80%, 90%, 95%, and 100% heterogenous PEC, based on the total weight of PEC in the blend. The PEC in the blend may comprise at least about, and/or at most about, 80%, 90%, 95%, and 100% homogeneous PEC, based on the total weight of PEC in the blend.

Heterogeneous polymers have a relatively wide variation in molecular weight and composition distribution. Heterogeneous polymers may be prepared with, for example, conventional Ziegler-Natta catalysts. On the other hand, homogeneous polymers have relatively narrow molecular weight and composition distributions, and may be prepared using single-site catalysts such as metallocene. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions.

Exemplary homogenous PEC includes PEC available from ExxonMobil under the VISTAMAXX VM1100 trade name (believed to have a density of 0.860 and an ethylene comonomer content of 13.4 wt. %).

The blend may comprise PEC (e.g., any one or more of any of the PECs discussed in this Application) in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend. The blend may comprise homogeneous PEC, heterogeneous PEC, and/or random PEC in any of the amounts set forth in the previous sentence.

Styrenic Block Copolymer

The blend may comprise styrenic block copolymer ("SBC"). Styrenic block copolymer includes styrene/butadiene/styrene copolymer ("SBS"), styrene/isoprene/styrene copolymer ("SIS"), styrene/ethylene-butylene/styrene copolymer ("SEBS"), styrene/ethylene-propylene/styrene ("SEPS"), and styrene/ethylene-propylene copolymer ("SEP").

SBC (e.g., any of the specific SBCs identified herein) may have a styrene comonomer content of at most about any of the following: 80, 75, 70, 65, 50, 40, 35, 32, 30, 28, 25, 20, and 15 wt. %; and at least about any of the following: 10, 12, 15, 20, 25, 28, 30, 32, 35, 40, 50, 60, and 70 wt. %, based on the weight of the SBC. The styrene comonomer content may also range between two or more ranges of the forgoing values, for example, from about 60 to about 80 wt. % and from about 12 to about 35 wt. %.

SBS may have a butadiene comonomer content of at most about any of the following: 30, 40, 50, 60, 65, 68, 70, 72, 75, 80, 85, 88, and 90 wt. %; and at least about any of the following: 20, 25, 30, 35, 50, 60, 65, 68, 70, 72, 75, 80, and 85 wt. %, based on the weight of the SBS. The butadiene comonomer content may range between two or more ranges of the forgoing values, for example, from about 65 to about 75 wt. % and from about 20 to 35 wt. %.

SIS may have a isoprene comonomer content of at most about any of the following: 30, 40, 50, 60, 65, 68, 70, 72, 75, 80, 85, 88, and 90 wt. %; and at least about any of the following: 20, 25, 30, 35, 50, 60, 65, 68, 70, 72, 75, 80, and 85 wt. %, based on the weight of the SIS. The isoprene comonomer content may range between two or more ranges of the forgoing values, for example, from about 65 to about 75 wt. % and from about 20 to 35 wt. %.

SBC (e.g., SBS, SIS) may comprise a substantially unsaturated elastomeric midblock (e.g., butadiene or isoprene comonomer midblock). These types of SBC are available from Kraton Polymers under the KRATON D trade name. For example, a linear SBS is available under the KRATON D2104 trade name (32% styrene content). SIS is also available from Kuraray Company under the HYBRAR trade name (e.g., HYBRAR 7125F).

SBC (e.g., SEBS, SEPS) may have a substantially saturated midblock. These types of SBC are available from Kraton Polymers under the KRATON G trade name. SEP, SEPS, and SEBS are also available from Kuraray Corporation under the SEPTON trade name.

SBC (e.g., SEBS, SEPS) may be modified (i.e., maleic anhydride grafted) as discussed in the "modified ethylene/unsaturated ester copolymer" section of this Application. Modified SBC (e.g., modified SEBS, modified SEPS) are available from Kraton Polymers under the KRATON FG trade name.

The blend may comprise SBC (e.g., any one or more of any of the types of SBC discussed herein) in an amount of at least about any of the following: 5, 10, 15, 20, 25, 30, 35, 40, and 45 wt. %; and at most about any of the following: 50, 45, 40, 35, 30, 25, 20, 15, and 10 wt. %, based on the weight of the blend.

Article Comprising the Blend

An article may comprise the blend. Representative articles include films, sheets, and thermoformed or foamed articles such as trays. A tray may, for example, be thermoformed from a sheet comprising the blend.

Film

A film may comprise the blend. A film may consist essentially of the blend. The film may be monolayer. The film may be multilayer. The film may comprise at least any of the following numbers of layers: 2, 3, 4, 5, 7, 9; and may comprise at most any of the following numbers of layers: 2, 3, 4, 5, 6, 7, 8, 9, 11, 13, and 15. The term "layer" in conjunction with a film refers to a discrete film component which is substantially coextensive with the film and has a substantially uniform composition. Where two or more directly adjacent layers have essentially the same composition, then these two or more adjacent layers may be considered a single layer for the purposes of this Application.

The film may have a total thickness of at least about, and/or at most about, any of the following: 1, 2, 3, 4, 5, 7, 9, 10, 12, and 15. As used herein, a film has a thickness of at most about 15 mils; and a sheet has a thickness of greater than about 15 mils.

The film may comprise at least one layer comprising the blend. The at least one layer comprising the blend may be an internal-layer of the film. An "internal layer" is a layer of the film that is between two other layers of the film.

The at least one layer comprising the blend may be an outer layer of the film. An "outer layer" of a multilayer film is a layer that has only one side directly adhered to another layer of the film. For multilayered films, there inherently exists two outer layers of the film. For a monolayer film, the sole layer may be considered an outer layer.

An "outside layer" is an outer layer of the film that is or is intended to be adjacent the space outside of a package comprising the film. An "inside layer" of a film is an outer layer of the film that is or is intended to be adjacent the space inside of a package comprising the film.

An outer layer may be adapted to function as a sealant layer, for example, a layer adapted to facilitate heat sealing the film to itself or another structure. A sealant layer may be an inside layer of a film.

The additional layers of the film (i.e., the layers other than the layers comprising the blend) may comprise one or more thermoplastic polymers, for example, polyolefins, polystyrenes, polyurethanes, polyamides, polyesters, and ionomers.

Below are some examples of combinations in which the alphabetical symbols designate the film layers. Where the multilayer film representation below includes the same letter more than once, each occurrence of the letter may represent the same composition or a different composition within the class that performs a similar function.

A/B, A/B/A, A/C/B, A/C/B/A, A/C/B/C/A, B/A/B, B/C/A/C/B, A/A/B, A/B/B, A/A/A/B, A/A/B/B, B/A/A/B, B/C/A/A/C/B

"A" represents a layer comprising the blend (i.e., the blend of polylactic acid and the polymer, as discussed above).

"B" represents a layer not comprising the blend, for example, comprising one or more of any of polyolefins, polystyrenes, polyurethanes, polyamides, polyesters, and ionomers.

"C" represents a tie layer, that is, a layer directly adhered (i.e., directly adjacent) to first and third layers, and that has the primary function of improving the adherence of the first layer to the third layer.

The layer comprising the blend may be directly adhered to a layer comprising polyolefin.

Any of the layers of the film may have a thickness of at least about, and/or at most about, any of the following: 0.05, 0.1, 0.5, 1, 1.3, 1.5, 2, 2.5, 3, 4, 5, and 6 mils. Any of the layers of the film may have a thickness as a percentage of the total thickness of the film of at least about, and/or at most about, any of the following: 1, 3, 5, 7, 10, 15, 20, 25, 30, 35, 40, 45, and 50 percent.

Appearance Characteristics of the Film

The haze of the film may be at most about, and/or at least about, any of the following values: 40%, 30%, 25%, 20%, 15%, 10%, 8%, 5%, and 3%. Haze is a measurement of the transmitted light scattered more than 2.5° from the axis of the incident light. Haze is measured against an outer layer of the film. The film may have any of the these haze values where the haze is measured against an outer layer comprising the blend. Haze is measured according to the method of ASTM D 1003, which is incorporated herein in its entirety by reference. All references to "haze" values in this Application are by this standard.

The film may have a gloss (i.e., specular gloss) as measured against the outer layer of at least about, and/or at most about, any of the following values: 40%, 50%, 60%, 63%, 65%, 70%, 75%, 80%, 85%, 90%, and 95%. The film may have any of the these gloss values where the gloss is measured against an outer layer comprising the blend. These percentages represent the ratio of light reflected from the sample to the original amount of light striking the sample at the designated angle. All references to "gloss" values in this Application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film may be at least about, and/or at most about, any of the following values: 30%, 40%, 50%, 65%, 70%, 75%, 80%, 85%, and 90%, measured in accordance with ASTM D1746. All references to "regular transmittance" or "clarity" values in this Application are by this standard.

The total luminous transmittance (i.e., total transmittance) of the film may be at least about, and/or at most about, any of the following values: 30%, 40%, 50%, 65%, 70%, 75%, 80%, 85%, and 90%, measured in accordance with ASTM D1003. All references to "total luminous transmittance" values in this Application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993).

Heat-Shrink Characteristic

The film comprising the blend may have a free shrink at 185° F. (85° C.) in at least one direction (e.g., the machine direction or the transverse direction) and/or in both the machine and transverse directions of at least about, and/or at most about, any of the following: 10%, 15%, 25%, 30%, 40%, 45%, 50%, 55%, 60%, 70%, and 80%.

The film may have unequal free shrink in both directions, that is differing free shrink in the machine and transverse directions. For example, the film may have a free shrink (185° F.) in the machine direction of at least 40% and a free shrink (185° F.) in the transverse direction of at least 25%. The film may not have a heat shrink characteristic in both directions. For example, the film may have a free shrink at 185° F. in one direction of less than about any of the following: 5%, 4%, 3%, 2%, 1%, and 0%; while the film may have a shrink characteristic at 185° F. in another direction. The free shrink of the film is determined by measuring the percent dimensional change in a 10 cm×10 cm film specimen when subjected to selected heat (i.e., at a specified temperature exposure) according to ASTM D2732, which is incorporated herein in its entirety by reference. All references to free shrink in this application are measured according to this standard.

As is known in the art, a heat-shrinkable film shrinks upon the application of heat while the film is in an unrestrained state. If the film is restrained from shrinking to some extent—for example by a packaged product around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The film may exhibit a shrink tension at 185° F. in at least one direction, and/or in at least both of the machine and transverse directions, of at least about, and/or at most about, any of the following: 50 psi, 75 psi, 100 psi, 125 psi, 150 psi, 175 psi, 200 psi, 225 psi, 250 psi, 275 psi, 300 psi, 325 psi, 350 psi, 400 psi, 450 psi, 500 psi, 550 psi, and 600 psi. The film may have unequal shrink tension in both directions, that is differing shrink tension in the machine and transverse directions. The film may not have a shrink tension in one or both directions. Shrink tension is measured at a specified temperature (e.g., 185° F.) in accordance with ASTM D 2838 (Procedure A), which is incorporated herein in its entirety by reference. All references to shrink tension in this application are by this standard.

The film may be annealed or heat-set to reduce the free shrink slightly or substantially; or the film may not be heat set or annealed once the oriented film has been quenched in order that the film will have a high level of shrink characteristic (e.g., heat shrinkability).

Energy to Peak

The energy to peak measurement is an indication of the toughness of the film. The energy to peak measurement may be made by integrating the stress/strain curve of the film that has been subjected to a impact device (i.e., a blunt needle or "tup") to puncture the film at a specified strain rate (i.e., speed). The equipment and procedure are described in J. L. Sormana and J. C. Meredith, "High-Throughput Discovery of Structure-Mechanical Property Relationships for Segmented Poly(urethane-urea)s," Macromolecules, Vol. 37, N6, pages 2186-2195 (Mar. 23, 2004), which is incorporated herein in its entirety by reference. All references to energy to peak in the Application are by this method.

Manufacturing the Film

The film may be manufactured by thermoplastic film-forming processes known in the art. The film may be prepared by extrusion or coextrusion utilizing, for example, a tubular trapped bubble film process or a flat film (i.e., cast film or slit die) process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) but at a temperature below the film's melting point. The film may then be quickly cooled to retain the physical properties generated during orientation and to provide a heat-shrink characteristic to the film. The film may be oriented using, for example, a tenter-frame process or a bubble process. These processes are known to those of skill in the art, and therefore are not discussed in detail here. The orientation may occur in at least one direction by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1.

Use of the Film

A package comprising the film may enclose a product, such as a food product selected from one or more of produce (e.g., vegetables, fruit), cheese, meat products, fresh red meat products, poultry, pork, beef, sausage, and fish. The package may be a bag comprising the film. For example, the film may be formed into a bag, such as by sealing the inside layer to itself in selected regions, or by sealing the inside layer to the outside layer in selected regions (i.e., a lap seal). Useful bags configurations include an end-seal bag, a side-seal bag, an L-seal bag (i.e., sealed across the bottom and along one side with an open top), and a pouch (i.e., sealed on three sides with an open top). The film may be provided in a tubular configuration, in which case only an end seal and a top seal need to be made to form a closed bag.

After forming the bag, the product may be inserted into the bag, and the open end of the bag sealed to enclose the product. The film may also be wrapped around a product and heat sealed to form a package enclosing the product. The film may be used as a wrap to cover and secure a product (e.g., a food product) that rests on a tray. The film may be used as a lid adapted to be sealed to a support (e.g., a tray) for the packaged product.

The package enclosing the product may be subjected to an elevated temperature to activate the heat shrink characteristic of the film so that the film and/or package comprising the film may conform to the contour of the enclosed packaged product. For example, the package may be passed through a hot air or steam tunnel or hot water bath.

The film may have a printed image applied to it, for example, by any suitable ink printing method, such as rotary screen, gravure, or flexographic techniques. The printed image may be applied to one or more layers comprising the blend.

The film may be used as a lid. The film may be used as a package overwrap.

Sheets and Trays

A sheet may comprise the blend. As discussed above, a sheet has a thickness of greater than about 15 mils. The sheet may have a thickness of at least about any of the following values: 16 mils, 18 mils, 20 mils, 23 mils, 26 mils, and 30 mils. The sheet may have a thickness of less than about any of the following values: 60 mils, 50 mils, 40 mils, 35 mils, 30 mils, and 25 mils.

The discussion above with respect to a film comprising the blend—i.e., regarding the number of layers, layer configuration, layer composition, appearance, and manufacture methods—applies as well to a sheet comprising the blend.

A tray comprising the blend may be formed, for example, by thermoforming a sheet comprising the blend to a desired shape. Methods of thermoforming sheets to form trays are well known in the art and are therefore not discussed in detail here. A molded article, such as a molded tray, may also be made from, and/or comprising, the blend.

EXAMPLES

The following examples are presented for the purpose of further illustrating and explaining the present invention and are not to be taken as limiting in any regard. Unless otherwise indicated, all parts and percentages are by weight.

The following abbreviations are used in the Examples:

PLA1 is polylactic acid available from NatureWorks LLC under the NATUREWORKS 4032D trade name.

PLA2 is polylactic acid available from NatureWorks LLC under the NATUREWORKS 4060D trade name.

PLA3 is polylactic acid available from NatureWorks LLC under the NATUREWORKS 4042 trade name.

mEVA1 is maleic anhydride modified ethylene/vinyl acetate copolymer having a vinyl acetate monomer content of about 25 wt. % and a density of about 0.98 g/cm3 available from DuPont Corporation under the BYNEL 3861 trade name.

mEVA2 is maleic anhydride modified ethylene/vinyl acetate copolymer having a vinyl acetate monomer content of about 28 wt. % and a density of about 0.95 g/cm3 available from DuPont Corporation under the FUSABOND MC250D trade name.

EVA1 is ethylene/vinyl acetate copolymer having an vinyl acetate monomer content of about 50 wt. % available from Lanxess Corporation under the LEVAMELT 500 trade name.

PEC1 is a homogeneous propylene/ethylene copolymer available from ExxonMobil Corporation under the VISTAMAXX VM1100 trade name (believed to have a density of 0.860 g/cm3 and an ethylene comonomer content of 13.4 wt. %).

PEA1 is polyetheramide block copolymer believe to have a melting point of 155° C. available from Arkema Corporation under the PEBAX 5533 trade name.

SBS1 is a styrene/butadiene/styrene block copolymer having about 27 wt. % styrene comonomer content available from Kraton Polymers under the KRATON 6932 trade name.

SBS2 is a styrene/butadiene/styrene block copolymer having about 75 wt. % styrene comonomer content available from AMCO under the AMALLOY B1199 trade name.

E/MA/GMA1 is ethylene/methyl acrylate/glycidyl methacrylate copolymer believed to have a methyl acrylate comonomer content of about 24 wt. %, and a glycidyl methacrylate comonomer content of about 8 wt. % available from Arkema Corporation under the LOTADER 8900 trade name.

Comparative 1

The seal strength of heat seals of about 1 mil-thick polylactic acid films commercially available from Treofan Corporation under the BIOPHAN trade name were evaluated by heat sealing representative samples of the film to each other using a Sencorp Model No. 12 ASL/1 machine under the following conditions: an ¼-inch wide sealing bar at a bar temperature as set forth in Table 1, a dwell time of 0.5 seconds, and a sealing pressure of 40 psig on the gauge reading of the machine. The seal strength was measured by determining the maximum amount of force (pounds force per inch or lbf/in) required to separate or delaminate the two films that were heat sealed together, measured in accordance with ASTM F88, with an Instron tensile tester crosshead speed of 10 inches per minute, averaging the results of five heat sealed sets of 1-inch wide, representative samples. All references to seal strength in this Application are by this method. The results are set forth in Table 1.

Comparative 2

The seal strength of heat seals of about 1 mil-thick polylactic acid films commercially available from Bi-Ax Corporation under the EVLON PLA HS trade name were evaluated as set forth above for Comparative 1. The results are set forth in Table 1.

Comparative 3

A monolayer cast Comparative 3 film having a thickness of about 2 mils was formed having a composition of 100 wt. % PLA1. The seal strengths of the Comparative 3 film heat sealed to itself as well as to other films is set forth in Table 1. The energy to peak and haze for the Comparative 3 film are set forth in Table 2. The energy to peak was measured at an impact speed of about 1 meter/second.

Comparative 4

A monolayer cast Comparative 4 film having a thickness of about 2 mils was formed having a composition of 100 wt. % PLA2. The seal strengths of the Comparative 4 film heat sealed to itself as well as to other films is set forth in Table 1.

Comparative 5

A monolayer cast Comparative 5 film having a thickness of about 2 mils was formed from a blend of 30 wt. % PLA1 and 70 wt. % PLA2. The seal strengths of the Comparative 5 film heat sealed to itself is set forth in Table 1.

Example 1

A monolayer cast Example 1 film having a thickness of about 2 mils was formed from a blend of 90 wt. % PLA1 and 10 wt. % PEC1. The seal strengths of the Example 1 film heat sealed (i) to itself, (ii) to the Comparative 2 film, and (iii) to the Comparative 3 film were evaluated as set forth above in the Comparative 1 discussion. The results are set forth in Table 1. The energy to peak and haze for the Example 1 film are set forth in Table 2. The energy to peak was measured by at a test speed of 1 meter/second.

Example 1B

A monolayer cast Example 1B film having a thickness of about 2 mils was formed from a blend of 95 wt. % PLA1 and 5 wt. % PEC1. The Example 1B film had a haze of 5.7%, a clarity of 29.8%, and a transmission of 95.6%.

Example 2

A monolayer cast Example 2 film having a thickness of about 2 mils was formed from a blend of 95 wt. % PLA2 and 5 wt. % mEVA1. The film had a haze of 11.6%, a clarity of 24.3%, and a transmission of 94.9%. The seal strengths of the Example 2 film heat sealed (i) to itself, (ii) to the Comparative 2 film, and (iii) to the Comparative 4 film were evaluated as set forth above in the Comparative 1 discussion. The results are set forth in Table 1.

Example 3

A monolayer cast Example 3 film having a thickness of about 2 mils was formed from a blend of 95 wt. % PLA1 and 5 wt. % EVA1. The film had a haze of 1.7%, a clarity of 46.5%, and a transmission of 95.5%. The seal strengths of the Example 3 film heat sealed to (i) itself and (ii) the Comparative 3 film were evaluated as set forth above in the Comparative 1 discussion. The results are set forth in Table 1. The energy to peak and haze for the Example 6 film are set forth in Table 2.

Example 4

A monolayer cast Example 4 film having a thickness of about 2 mils was formed from a blend of 80 wt. % PLA1 and 20 wt. % EVA1. The film had a haze of 6.1%, a clarity of 7.0%, and a transmission of 95.4%. The seal strengths of the Example 4 film heat sealed to itself evaluated as set forth above in the Comparative 1 discussion. The results are set forth in Table 1. The peak load, energy to peak, and haze for the Example 6 film are set forth in Table 2.

Example 5

A monolayer cast Example 5 film having a thickness of about 2 mils was formed from a blend of 80 wt. % PLA1 and 20 wt. % PEA1. The film had a haze of 21.4%, a clarity of 27.8%, and a transmission of 91.1%. The seal strengths of the Example 5 film heat sealed to itself were evaluated as set forth above in the Comparative 1 discussion. The results are set forth in Table 1. The peak load, energy to peak, and haze for the Example 5 film are set forth in Table 2.

Example 5B

A monolayer cast Example 5B film having a thickness of about 2 mils was formed from a blend of 95 wt. % PLA1 and 5 wt. % PEA1. The film had a haze of 6.0%, a clarity of 48.0%, and a transmission of 94.3%. The seal strengths of the Example 5B film heat sealed to itself were evaluated as set forth above in the Comparative 1 discussion. The results are set forth in Table 1.

Example 6

A monolayer cast Example 6 film having a thickness of about 2 mils was formed from a blend of 80 wt. % PLA1 and 20 wt. % mEVA1. The film had a haze of 30.9%, a clarity of 0.8%, and a transmission of 94.0%. The energy to peak and haze for the Example 6 film are set forth in Table 2.

Example 7

A monolayer Example 7 film was made by extrusion using a tubular trapped bubble blown film process. The film had a thickness of about 1.6 mils, a haze of 7.6%, and a clarity of 13.4%. The film was formed from a blend of 24 wt. % PLA1, 56 wt. % PLA2, and 20 wt. % EVA 1. The seal strengths of the Example 7 film heat sealed to itself evaluated as set forth above in the Comparative 1 discussion. The results are set forth in Table 1.

Example 8

A monolayer Example 8 film was made by extrusion using a tubular trapped bubble blown film process. The film had a thickness of about 1.9 mils, a haze of 18.1%, and a clarity of 17.8%. The film was formed from a blend of 27 wt. % PLA1, 63 wt. % PLA2, and 10 wt. % PEC1. The seal strengths of the Example 8 film heat sealed to itself evaluated as set forth above in the Comparative 1 discussion. The results are set forth in Table 1.

Example 9

A monolayer Example 9 film was made by extrusion using a tubular trapped bubble blown film process. The film had a thickness of about 2 mils, a haze of 24.7%, and a clarity of 18.3%. The film was formed from a blend of 24 wt. % PLA1, 56 wt. % PLA2, and 20 wt. % PEC1. The seal strengths of the Example 9 film heat sealed to itself evaluated as set forth above in the Comparative 1 discussion. The results are set forth in Table 1.

TABLE 1

|  | Film Comp. | Sealing Bar Temperature (° C.) | | | | | | | | |
|---|---|---|---|---|---|---|---|---|---|---|
|  |  | 80° C. | 90 | 95 | 100 | 105 | 110 | 115 | 120 | 130 |
|  |  | Seal Strength (lbf/in) | | | | | | | | |
| Comp 1 | PLA | 1.6 | 1.58 | — | 1.53 | — | 1.43 | — | 1.52 | 1.47 |
| Comp 2 | PLA | — | — | 1.03 | 1.45 | 1.60 | 1.65 | 1.51 | 1.64 | — |
| Comp 3 | PLA1 | — | — | 0.03 | 0.08 | 0.29 | 2.55 | 5.36 | 3.68 | — |
| Comp 4 | PLA2 | — | — | 0.76 | 0.96 | 4.67 | 5.83 | 7.84 | 6.59 | — |
| Comp 5 | PLA1-30% PLA2-70% | — | — | 0.07 | 0.14 | 0.66 | 1.18 | 2.47 | 2.88 | — |
| Example 1 | PLA1-90% PEC1-10% | — | — | 0.04 | 0.36 | 2.80 | 4.81 | 5.99 | 7.08 | — |
| Example 1: Comp 2 |  | — | — | 1.44 | 2.30 | 2.46 | 1.01 | 0.94 | 2.67 | — |
| Example 1: Comp 3 |  | — | — | 0.43 | 1.86 | 3.78 | 4.76 | 6.29 | 7.32 | — |
| Example 2 | PLA2-95% mEVA1-5% | — | — | 2.17 | 5.18 | 8.51 | 9.30 | 9.77 | 9.75 | — |
| Example 2: Comp 2 |  | — | — | 2.68 | 2.63 | 2.77 | 2.68 | 2.45 | 1.49 | — |
| Example 2: Comp 4 |  | — | — | 2.57 | 4.99 | 7.10 | 7.44 | 7.43 | 7.39 | — |
| Example 3 | PLA1-95% EVA1-5% | — | — | 0.07 | 0.81 | 2.23 | 4.39 | 4.97 | 6.06 | — |
| Example 3: Comp 3 |  | — | — | 0.10 | 0.18 | 3.05 | 4.30 | 5.69 | 6.36 | — |
| Example 4 | PLA1-80% EVA1-20% | — | — | 0.11 | 0.64 | 2.11 | 4.62 | 5.40 | 6.37 | — |
| Example 5 | PLA1-80% PEA1-20% | — | — | 0.48 | 1.85 | 3.80 | 6.43 | 6.67 | 8.50 | — |
| Example 5B | PLA1-95% PEA1-5% | — | — | 0.04 | 0.08 | 0.13 | 2.81 | 3.36 | 6.40 | — |
| Example 7 | PLA1-24% PLA2-56% EVA1-20% | — | — | 2.01 | 2.79 | 3.45 | 3.33 | 4.80 | 4.36 | — |

TABLE 1-continued

| | | Sealing Bar Temperature (° C.) | | | | | | | | |
|---|---|---|---|---|---|---|---|---|---|---|
| | | 80° C. | 90 | 95 | 100 | 105 | 110 | 115 | 120 | 130 |
| | Film Comp. | | | | Seal Strength (lbf/in) | | | | | |
| Example 8 | PLA1-27% PLA2-63% PEC1-10% | — | — | 0.99 | 3.69 | 3.74 | 4.94 | 5.69 | 5.79 | — |
| Example 9 | PLA1-24% PLA2-56% PEC1-20% | — | — | 1.93 | 2.24 | 3.85 | 3.54 | 3.87 | 3.91 | — |

In the Table 1, the "film: film" nomenclature indicates that the first listed film was heat sealed to the second listed film. A film identified without a colon indicates that the film was heat sealed to itself.

TABLE 2

| | Film Comp. | Energy to Peak (mJ) Test Speed 1 m/s | Energy to Peak (mJ) Test Speed 0.25 m/s | Energy to Peak (mJ) Test Speed 1.12 m/s | Haze (%) |
|---|---|---|---|---|---|
| Compare 3 | PLA1 | 0.79 | 0.93 | 0.48 | <2 |
| Example 1 | PLA1-90% PEC1-10% | 1.71 | — | — | 8.2 |
| Example 3 | PLA1-95% EVA1-5% | — | 2.58 | 0.85 | 1.7 |
| Example 4 | PLA1-80% EVA1-20% | — | 2.76 | 1.04 | 6.1 |
| Example 5 | PLA1-80% PEA1-20% | — | 2.46 | 1.00 | 21.4 |
| Example 6 | PLA1-80% mEVA1-20% | — | 2.55 | 0.99 | 30.9 |

Examples 10 Through 21

Monolayer cast Example 10 through 21 films each having a thickness of about 2 mils were formed from the blends set forth in Table 3. The seal strengths of each of the Example 10-15 and 19-21 films heat sealed to itself were evaluated as set forth above in the Comparative 1 discussion. The results are set forth in Table 4.

TABLE 3

| | Amount in Blend (wt. %) | | | | | | | |
|---|---|---|---|---|---|---|---|---|
| | PLA3 | mEVA2 | SBS1 | SBS2 | E/AE/GMA1 | Haze (%) | Gloss | Transmission |
| Example 10 | 95 | 5 | — | — | — | 23.3 | 41.6 | 95.4 |
| Example 11 | 90 | 10 | — | — | — | 55.6 | 20.8 | 94.6 |
| Example 12 | 80 | 20 | — | — | — | 69.7 | 11.1 | 94.1 |
| Example 13 | 95 | — | 5 | — | — | 15.4 | 61.7 | 95.0 |
| Example 14 | 90 | — | 10 | — | — | 26.5 | 60.6 | 95.0 |
| Example 15 | 80 | — | 20 | — | — | 35.7 | 50.6 | 94.7 |
| Example 16 | 95 | — | — | 5 | — | 73.9 | 44.4 | 92.3 |
| Example 17 | 90 | — | — | 10 | — | 96.6 | 24.5 | 91.2 |
| Example 18 | 80 | — | — | 20 | — | 101 | 10.2 | 90.0 |
| Example 19 | 95 | — | — | — | 5 | 10.8 | 52.5 | 94.4 |
| Example 20 | 90 | — | — | — | 10 | 10.9 | 60.0 | 93.9 |
| Example 21 | 80 | — | — | — | 20 | 21.9 | 58.5 | 93 |

Comparative 6

A monolayer cast Comparative 6 film having a thickness of about 2 mils was formed having a composition of 100 wt. % PLA3. The seal strengths of the Comparative 6 film heat sealed to itself are set forth in Table 4.

TABLE 4

| Sealing Bar Temperature | Seal Strength (lbf/in) | | | | | | | | |
|---|---|---|---|---|---|---|---|---|---|
| | 80° C. | 85° C. | 90° C. | 95° C. | 100° C. | 105° C. | 110° C. | 115° C. | 120° C. |
| Comp 6 | — | 0.05 | 0.20 | 0.78 | 0.96 | 2.13 | 2.47 | 3.23 | 3.49 |
| Example 10 | — | 0.13 | 0.31 | 2.16 | 3.95 | 4.67 | 5.49 | 6.48 | 7.46 |
| Example 11 | — | 0.05 | 0.13 | 0.58 | 2.71 | 4.14 | 6.63 | 6.68 | 6.97 |
| Example 12 | — | 0.35 | 1.92 | 3.44 | 5.22 | 5.50 | 5.64 | 5.88 | 5.57 |
| Example 13 | — | 0.08 | 0.29 | 1.31 | 3.02 | 3.97 | 4.60 | 4.80 | 4.95 |
| Example 14 | 0.073 | 0.70 | 2.15 | 5.08 | 6.73 | 8.73 | 8.85 | 8.89 | 9.08 |
| Example 15 | 0.057 | 0.89 | 1.90 | 3.80 | 5.34 | 6.69 | 7.28 | 7.13 | 7.24 |
| Example 19 | — | 0.18 | 1.41 | 3.01 | 5.15 | 6.77 | 6.95 | 7.62 | — |
| Example 20 | — | 0.11 | 1.61 | 6.56 | 9.22 | 9.29 | 9.21 | 9.35 | — |
| Example 21 | 0.50 | 1.06 | 3.51 | 5.72 | 8.61 | 9.40 | 9.64 | 9.85 | — |

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed:
1. A blend comprising:
   at least 50%, by weight of the blend, of polylactic acid; and
   at least 5%, by weight of the blend, of polymer selected from one or more of:
   (i) ethylene/unsaturated ester copolymer having an unsaturated ester comonomer content of at least about 30% based on the weight of the ethylene/unsaturated ester copolymer, wherein the unsaturated ester comonometer comprises vinyl ester of aliphatic carboxylic acid comonometer where the ester has from 4 to 12 carbon atoms;
   (ii) modified ethylene/unsaturated ester copolymer;
   (iii) polyetheramide block copolymer;
   (iv) propylene/ethylene copolymer comprising at least about 12% and at most about 16% ethylene monomer content based on the weight of the propylene/ethylene copolymer; and
   (v) styrenic block copolymer.

2. The blend of claim 1 comprising at most about 50%, by weight of the blend, of the polymer.

3. The blend of claim 1 comprising at most about 20%, by weight of the blend, of the polymer.

4. The blend of claim 1 comprising at least about 80%, by weight of the blend, of the polylactic acid.

5. The blend of claim 1 comprising at least 5%, by weight of the blend, of ethylene/unsaturated ester copolymer having an unsaturated ester comonomer content of at least about 30%, based on the weight of the ethylene/unsaturated ester copolymer.

6. The blend of claim 5 wherein the ethylene/unsaturated ester copolymer comprises at least about 30% vinyl acetate comonomer content based on the weight of the ethylene/unsaturated ester copolymer.

7. The blend of claim 5 wherein the ethylene/unsaturated ester copolymer comprises at least about 40% vinyl acetate comonomer content based on the weight of the ethylene/unsaturated ester copolymer.

8. The blend of claim 1 wherein the blend comprises at least 5%, by weight of the blend, of modified ethylene/unsaturated ester copolymer.

9. The blend of claim 8 wherein the modified ethylene/unsaturated ester copolymer comprises at least about 15% vinyl acetate comonomer content based on the weight of the ethylene/unsaturated ester copolymer.

10. The blend of claim 8 wherein the modified ethylene/unsaturated ester copolymer comprises at least about 30% vinyl acetate comonomer content based on the weight of the ethylene/unsaturated ester copolymer.

11. The blend of claim 1 comprising at least 5% by weight of the blend, of polyetheramide block copolymer.

12. The blend of claim 11 wherein the polymer is polyetheramide block copolymer having a melting point of at most about 210° C.

13. The blend of claim 11 wherein the polymer is polyetheramide block copolymer having a melting point of at most about 160° C.

14. The blend of claim 1 wherein the blend comprises at least 5%, by weight of the blend, of propylene/ethylene copolymer comprising at least about 12% and at most about 16% ethylene monomer content based on the weight of the propylene/ethylene copolymer.

15. The blend of claim 14 wherein the propylene/ethylene copolymer is homogeneous.

16. The blend of claim 1 comprising at least 5%, by weight of the blend, of styrenic block copolymer.

17. The blend of claim 16 wherein the styrenic block copolymer is selected from one or more of styrene/butadiene/styrene copolymer, styrene/isoprene/styrene copolymer, styrene/ethylene-butylene/styrene copolymer, styrene/ethylene-propylene/styrene, and styrene/ethylene-propylene copolymer.

18. The blend of claim 16 wherein the styrenic block copolymer has a styrene comonomer content of at most about 40 wt. %, based on the weight of the styrenic block copolymer.

19. The blend of claim 16 wherein the styrenic block copolymer is styrene/butadiene/styrene copolymer having a butadiene comonomer content of at least about 60 wt. %, based on the weight of the styrene/butadiene/styrene copolymer.

20. The article comprising the blend of claim 1

21. The article of claim 20 wherein the article is a tray.

22. The article of claim 20 wherein the article is a tray and the blend forms a surface of the tray.

23. The article of claim 20 wherein the article is a film.

24. The article of claim 20 wherein the article is a multilayer film comprising at least one layer comprising the blend that is directly adhered to a layer comprising polyolefin.

* * * * *